INVENTOR.
E. E. CLARK
BY Hudson & Young
ATTORNEYS

Feb. 23, 1960 E. E. CLARK 2,925,912
FILTER BACK-WASH SYSTEM
Filed Nov. 19, 1956 2 Sheets-Sheet 2

INVENTOR.
E. E. CLARK
BY Hudson & Young
ATTORNEYS

United States Patent Office 2,925,912
Patented Feb. 23, 1960

2,925,912

FILTER BACK-WASH SYSTEM

Ernest E. Clark, Shidler, Okla., assignor to Phillips Petroleum Company, a corporation of Delaware Application November 19, 1956, Serial No. 623,196

9 Claims. (Cl. 210—108)

This invention relates to oil field water-flood systems for production of oil. In one aspect it relates to the operation of filters in the water treating system of a water-flood operation. In another aspect it relates to the sequential filtering and back washing steps and apparatus therefor for treatment of water used in a water-flood operation.

In the operation of oil field water-flood systems, recycle water is treated to prevent formation plugging due to the presence in the water of oil-in-water emulsion, sediment, lint, dust, dirt and any matter foreign to water and insoluble therein. The water is also usually treated with a corrosion inhibitor to prevent, or at least minimize corrosion of pumps, pipes, vessels and other equipment with which the water comes in contact.

An object of my invention is to provide a water filtration system for preparation of water for use in water-flood operations, which requires less equipment and is simpler and less expensive to construct and to operate than systems now in use.

Another object of my invention is to provide such a system which is automatic or substantially automatic in operation thereby requiring a minimum of manual inspection and manual operation.

Other objects and advantages of my invention will be realized upon reading the following description, which, taken with the attached drawing, forms a part of this disclosure.

My invention comprises, broadly a liquid filter system comprising, in combination, a filter vessel, filter bed material disposed operatively in said vessel, first and second conduits communicating the portion of said vessel on one side of said filter bed material with a vessel for containing clear liquid, first and second motor valves in said first and second conduits respectively, a third conduit communicating the portion of said filter vessel on the other side of said filter bed material and a supply of liquid to be filtered, a fourth conduit communicating the portion of said filter vessel on said other side of said filter bed material with a backwash material disposal, first and second check valves in said third and fourth conduits respectively, said first and second check valves being adapted to pass liquid to and from said filter vessel respectively, said third conduit including a first inverted U-tube, a second inverted U-tube one leg of which communicates with said third conduit, means for transferring liquid in said second conduit to said filter vessel, said fourth conduit including a third inverted U-tube, said third U-tube being provided with a siphon breaker, the tops of said first, second and third U-tubes being disposed at successively higher elevation, means to close said first motor valve and to open said second motor valve and to render operative said means for transferring liquid in said second conduit simultaneously, and alternately to open said first motor valve and to close simultaneously said second motor valve.

Figure 1:
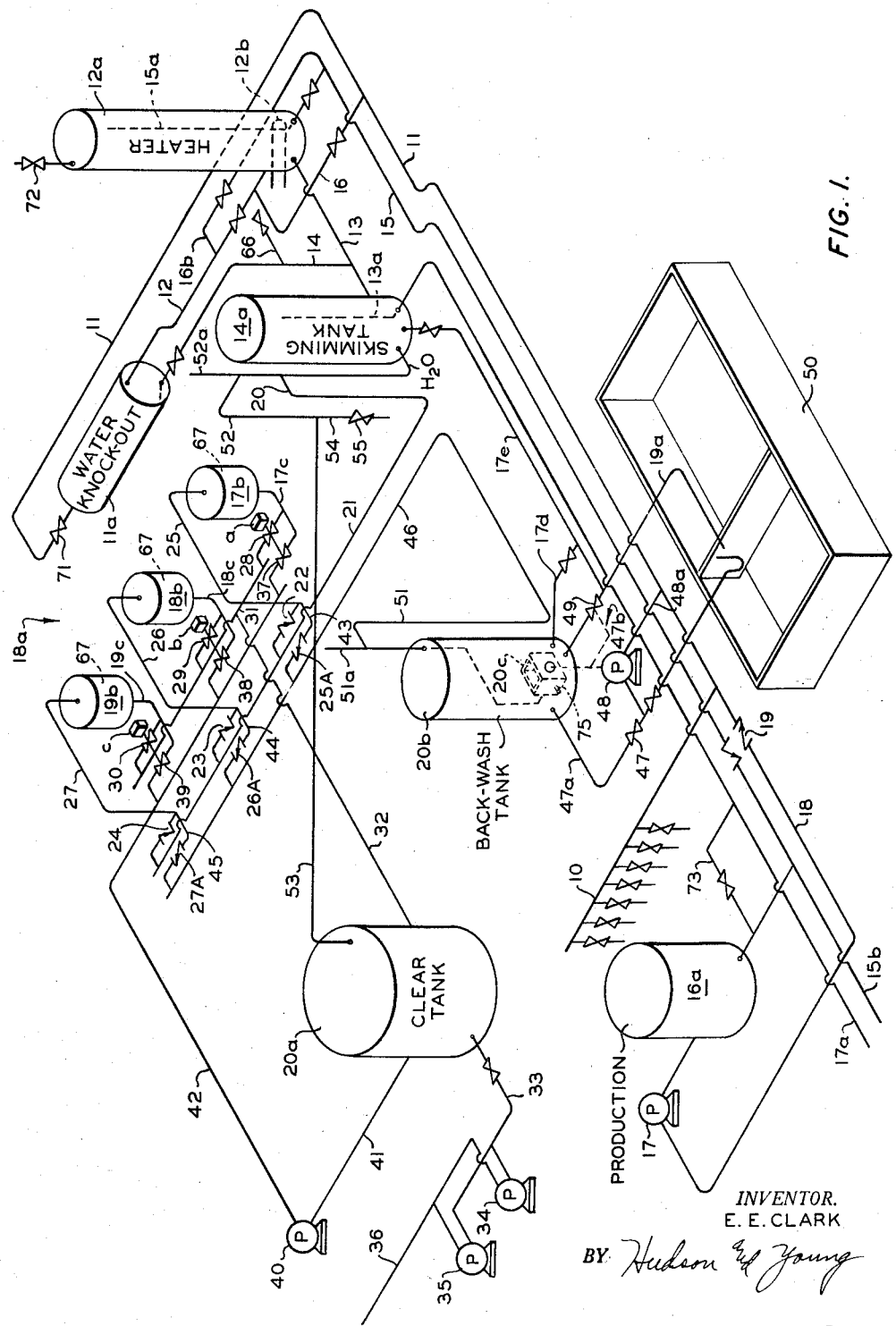
Figure 1 is a detailed view, in perspective, of an arrangement of apparatus parts for carrying out my invention.

Figure 1 illustrates, schematically, a water filter system of my invention for use in conjunction with a water-flood secondary oil production system. In this figure reference numeral 10 identifies a header or gathering manifold line for collecting water and oil from water flood production wells. Oil and water thus come to my treating and filter system through header line 10 and flow on through a pipe 11 containing a valve 71 into a water knock-out tank 11a. In this tank oil and water separate at least to some extent with usually a layer of oil and water emulsion between them. In many cases these layers are not sharp nor well defined, and the emulsion layer many even predominate. A pipe 12 connects the upper portion of tank 11a with a heater tank 12a, and this pipe is intended to conduct emulsion and any separated oil from tank 11a to tank 12a. A pipe 13 leads from tank 12a to a skimming tank 14a for passage of aqueous settlings. A pipe 14 connects tank 11a with pipe 13 also for passage of aqueous settlings to the skimming tank. The heater tank is provide with heating means, such as a steam coil 12b, for heating the emulsion to expedite separation of oil and water. A valved pipe 72 is also provided for removal of gas. An open end pipe 15a is vertically disposed in tank 12a for removal of separated oil phase which flows on through a pipe 15 to an oil production tank 16a. Oil not separated in tank 12a is given an opportunity to separate in the skimming tank 14a. A pipe 13a is provided for tank 14a for oil removal as was pipe 15a in tank 12a. Oil from pipe 13a passes on through a pipe 17a for such disposal, as desired, or provision is sometimes made for combining the oil in pipe 17a with that flowing in pipe 15 by inserting a valved pipe 73 connecting these latter pipes. Settlings from tank 14a are withdrawn via pipe 17e and are passed on through a pipe 19a to a sludge tank 50.

Water, free of easily settled materials, passes from the skimming tank 14a through an inverted U-tube 20 and through a pipe 21 to a filter system 18a. This filter system is intended to remove all material from the water prior to injection into the input wells so that water injected will have little to no tendency to carry foreign material into the formation. As is well known in the water flooding art, foreign material, almost regardless of its degree of subdivision, will ultimately plug the formation. From pipe 21, water to be filtered passes through a pipe 25 provided with a check valve 22 into the top of a filter vessel 17b. Filtered water leaves this vessel via pipe 17c and flows through a valve 28 into a pipe 31 and passes therefrom through a pipe 32 into a clear water tank 20a. Pipe 25 is provided with a branch pipe 43 containing a check valve 25A adapted to pass liquid through pipe 43 into a pipe 46. Water to be filtered passing through check valve 22 into pipe 25 does not pass through check valve 25A and pipe 46 nor over the U-tube 51 because the inverted U-tube 51 is higher than inverted U-tube 52. However, in case filter tank 17b becomes plugged, water from U-tube 20 passes through U-tube 52 and flows through pipe 53 to the clear water tank in preference to flowing through the filter and over the most elevated U-tube 51, thereby maintaining a constant supply of water in clear tank 20a for injection into the injection well or wells.

To backwash the filter in filter tank 17b it is merely necessary to close valve 28 and open valve 37 and start pump 40. Pump 40 takes suction on tank 20a and pumps clear, filtered water therefrom through pipes 41 and 42, the water passing through valve 37, pipe 17c and into tank 17b below the filter bed. Backwash water and previously separated sediment, etc., leave tank 17b via pipe 25 and pass through pipe 43, check valve 25A, pipe 46 and the inverted U-tube 51 into an open top inlet box 20c in tank 20b under pressure from pump 40.

After backwashing the filter tank 17b, valve 37 is closed and valve 28 is opened and under these conditions water to be filtered again passes from skimming tank 14a through U-tube 20, pipe 21, check valve 22 and pipe 25 into the tank 17b and filtered water leaves via pipe 17c, valve 28 and pipes 31 and 32 and enters the clear water tank 20a. At about the time of this last mentioned valve switching, tank 18b is started on its backwashing cycle by closing valve 29, opening valve 38, and starting pump 40 in case it was shut off when valve 37 was closed. Clear water from tank 20a then passes through pipe 41, pump 40, pipe 42, valve 38 and pipe 18c to filter 18b. Backwash water and sediment leave filter 18b through pipes 26 and 44, check valve 26A and pipe 46 through U-tube 51 into backwash tank 20b under pressure of pump 40. When the backwashing of filter tank 18b is completed, valve 38 is closed and valve 29 is opened, which change of valves then allows water to be filtered to pass from the skimming tank 14a through pipe 21, check valve 23 and pipe 26 into the filter tank. Filtered water therefrom passes through pipe 18c, valve 29, pipe 31 and through pipe 32 in to the clear tank 20a. In like manner, for backwashing filter tank 19b, valve 39 is opened and valve 30 is closed and clear water enters this filter through pipe 19c and water and sediment leave via pipes 27 and 45 and pass through check valve 27A, pipe 46 and U-tube 51 into the backwash tank 20b. Upon completion of the backwashing of filter tank 19b, valve 39 is closed and valve 30 is opened and water to be filtered passes from the skimming tank through check valve 24 and pipe 27 into filter. Clear, filtered water leaves this filter via pipe 19c, valve 30, pipe 31 and enters the clear tank 20c through pipe 32.

After completion of the backwashing of the filters, the system continues the filtration portion of the cycle until such time as it is desired again to backwash the filters.

The backwash water with entrained sediment from the several filter tanks, as mentioned, was stated as being passed into the backwash tank 20b. After a sufficient period of time for the sediment to settle has elapsed, the supernatant water is removed from the backwash tank through pipe 47a, with valve 47 being open, and is passed through pipe 48a by pump 48 into pipe 11 for refiltration in the system. After removal of the supernatant water to a predetermined level, a float controller assembly 47b closes off pump 48 and opens valve 49 to drain the settled sediment to the pit or sludge tank 50. The float controller assembly closes valve 49 when a predetermined high liquid level is reached in box 20c. Valve 49 controls removal of sludge from box 20c through pipe 19a while sludge from the tank bottom passes through pipes 17d and 17e into pipe 19a and thence to sludge tank 50.

Clean oil comprising the upper phase in the heater 12a was hereinbefore stated as being passed through the open end pipe 15a and pipe 15 into the production tank 16a. The production tank serves as a storage tank prior to shipment of the oil, or as a run storage tank in case it is ever desired to retreat its contents. For retreating this oil it is transferred by a pump 17 through a pipe 18 containing a check valve 19 into pipe 11 normally carrying well production, that is, oil and water, to the treating and filter system. A by-pass pipe 16 is provided in case the wells are closed down and not producing and it is desired to retreat the once treated oil from the production tank 16a, under which condition oil from tank 16a is pumped by pump 17 through pipes 18, 11 and valved pipe 16 into the heater 12a. In case the oil and water mixture entering tank 11a separates easily and use of the heater tank 12a is not required, the oil in pipe 12 from tank 11a by-passes tank 12a by flowing through pipes 16b and 15 directly to production storage 16a.

Pumps 34 and 35 take suction on the clear water in tank 20a and transfer it under pressure through a pipe 36 to one or more water injection wells, not shown in Figure 1.

During the filtration step of the filters 18b and 19b, as well as for 17b, water from the skimming tank 14a does not pass through pipes 44, 45 nor 43 and through pipe 46 to the backwash tank 20b because the water passes over U-tube 52 and out via pipe 53 in preference to passing over the U-tube 51 to the backwash tank since U-tube 51 is higher than U-tube 52. Thus, if the filters become so plugged that the pressure drop therethrough is unnecessarily high, the water will flow from the top of the U-tube 20 through a U-tube 52 and pipe 53 directly to the clear tank 20a. When water so flows through U-tube 52, water accumulates in pipe 54 and water in this pipe is detected by opening valve 55 manually for inspection. U-tube 52 is provided with an open end vent pipe or siphon breaker 52a, as shown. This siphon breaker 52a also serves as a siphon breaker for the U-tube 20. U-tube 51 is also provided with a siphon breaker 51a.

As an example of the positioning of the U-tubes of my filter system the inverted U-tube 52 extends about five feet above the top of the inverted U-tube 20 and the top of the inverted U-tube 51 extends 10 feet above the top of the U-tube 20. The pressure drop of the water passing through the filters is equal to about two feet head of water above the top of the inverted U-tube 20.

It will be understood that the dimensions just given can be varied to meet local conditions at a given filter installation.

Usually, the amount of solid matter to be filtered from the water is not large and the cycle periods in which the filters are on filtration are long compared to the backwash periods. For example, backwash periods under some conditions, require time intervals of, for example, from 5 to 15 minutes, while the filtration period utilizes the remainder of a 24-hour period.

While the particular filter bed material employed in such a filter system as herein disclosed is immaterial to the invention, such a material as sand, or sand and gravel, is usually used. Other suitable material such as carbonaceous matter can be used alone or in conjunction with the sand and gravel.

It should be realized that while I herein explain the operation of a filter system employing three filters, any desired number of filters can be used embodying the principles of my invention by inserting additional cams and contact points on the timer B and stepping switch C (Fig. 2) with the necessary wiring similar to that illustrated and leading to the additional valve controls.

As mentioned hereinbefore, the sludge backwashed from the filters is run into the backwash tank 20b for settling. It is usual practice in this backwash system to allow the contents of the backwash tank to settle during most of a 24-hour period. Clear water is then pumped out by pump 48 through pipe 48a into pipe 11 and the settled sludge is drained via pipe 19a and into the pit 50 just prior to the beginning of the next backwash cycle so that the sludge has the longest possible settling time. This water pumping out and sludge drainage is preferably started manually but I have provided a float controller mechanism 47b for shutting down the pump 48 and opening valve 49 when the float of the controller begins to fall because of flow of aqueous sludge from box 20c through a nipple 75 into the tank when the water outside box 20c reaches a level below the top level of the box. The float controller also closes valve 49 when the level of the sludge entering through the down-flow leg of U-tube 51 reaches a high predetermined level. Box 20c is rectangular in section and is placed a short distance away from the wall of the tank. Before backwashing starts, pump 48 is started either manually or automatically, and valve 47 opened manually, or automatically as hereinafter disclosed. Water is then pumped through pipe 47a, valve 47, pipe 48a and pipe 11 to the water knockout drum 11a. When the water level in tank 20b falls below the top of box 20c, the float of the float assembly 47b starts to fall slowly because liquid in the box starts to drain slowly through the ½ inch diameter nipple 75 in the wall of the box. When the float begins to fall valve 49 begins to open, slowly, thereby allowing sediment and water to start draining from the tank 20c through pipe 19a to pit 50. As the float falls farther valve 49 opens wider and finally a major portion of the sediment is withdrawn. When the float reaches its lowest level the pump 48 is shut down and valve 47 is closed and the tank is prepared to receive another charge of backwash water. The box 20c, the level to which pump 48 draws water and the size of the drain nipple 75 are so proportioned that the float shuts down the pump before starting to draw air through pipe 47a. The downflow leg of U-tube 51 discharges aqueous sludge into the box 20c so that the float will rise quickly and quickly close off valve 49 so that unsettled aqueous sludge will not pass into pit 50.

Pipe 17d is provided in case it is ever desired to withdraw settled sludge or liquid from the tank manually.

Figure 2:
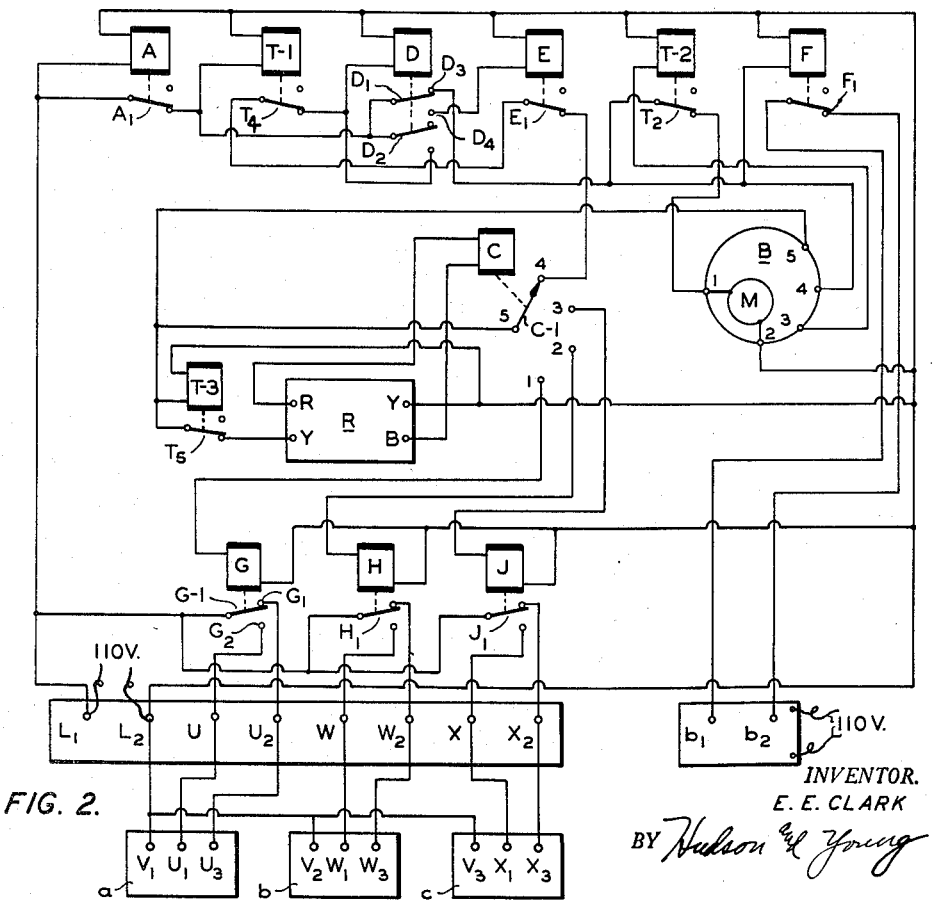
Figure 2 illustrates an electrical wiring system suitable for operating the filter system illustrated in Figure 1.

My hereinabove mentioned backwash system is controlled electrically through a circuit system such as illustrated in Figure 2. On reference to Figure 2, a timer A closes switch $A_1$ at a fixed time each day and the switch remains closed for a predetermined time interval, this interval being somewhat longer than the total time required to backwash the series of filters. When switch $A_1$ closes, a circuit is completed through relay T-1 closing switch $T_4$ after a delay of 30 seconds. This delay is to prevent actuation of relay D during the short time interval that contacts 4 and 5 of a solenoid stepping switch C are connected. After the expiration of the 30 seconds' delay, relay D operates to close switch $D_1$ to complete a circuit through contact $D_3$, switch $T_2$, and contacts 1 and 2 of a motor timer B. When motor M of timer B is energized, contacts 4 and 5 of timer B are connected, thus completing a circuit through contacts of timer B, switch $T_5$ and the contacts marked Y, Y of a rectifier R. A circuit is also completed through a relay T-3 thereby opennig switch $T_5$ after a short time interval. Completion of the circuit through the contacts Y, Y of rectifier R allows direct current to flow from contacts R, B through the solenoid stepping switch C. This flow of current through stepping switch C causes the switch to step from contact 4 to contact 1 thereby connecting contacts 5 and 1, and opening the circuit through contacts 5 and 4. The circuit through switch C is then opened to prevent further movement of connecting arm, and after a short interval switch $T_5$ is opened to interrupt the flow of current through Y, Y of the rectifier R. When arm C-1 connects contacts 5 and 1 of stepping switch C, current flows through relay G thus switching contact arm G-1 from its normal position $G_1$ to position $G_2$ to complete a circuit through contacts, $L_1$, U, $U_1$, $V_1$ and $L_2$. $L_1$ and $L_2$ are connected with a source of 110 volts of alternating current for operation of the entire system. Contacts $U_1$ and $V_1$ lead to a valve operating mechanism a for operating valves 28 and 37 of Figure 1. The valve operating mechanism a is in some cases a reversible motor mechanism, and in other cases is a solenoid mechanism. In either case when the respective mechanism operates to close valve 37 it simultaneously opens valve 28 and vice versa, i.e., when the mechanism operates to close valve 28 it simultaneously opens valve 37. In the case just described when contact arm G-1 closes a circuit through $G_2$, the current flowing through contacts $U_1$ and $V_1$ causes valve 37 to open and valve 28 to close thereby setting these valves for backwashing filter 17b.

At the time these valves 37 and 28 are set for back- washing filter 17b a circuit is also closed through relay F to close a circuit through contact $F_1$ and the contacts $b_1$ and $b_2$ of the motor of the backwash pump 40, see Figure 1, under which conditions clear water from tank 20a passes through valve 37 to backwash filter 17b, the backwash water and sludge leaving the filter and passing through pipes 25, 43, check valve 25A and pipe 46 and U-tube 51 into the backwash tank 20b.

After a predetermined time interval, say fifteen minutes, selected for the duration of the backwashing of each filter, timer B breaks the circuit through its contacts 4 and 5 and connects contacts 3 and 4, thus energizing relay T-2. After a predetermined short interval relay T-2 operates to open switch $T_2$ thus allowing timer B to reset and also breaking the circuit through contact 1 of the stepping switch C thus permitting relay G to return switch or contact arm G-1 to its normal position in contact with connection $G_1$ which closes a circuit through contacts $U_2$ and $U_3$ to close valve 37 and to open valve 28 and place filter 17b on filtration cycle.

When switch $T_2$ again closes, a similar cycle is repeated to energize the circuits controlled by stepping switch C contacts 2 and 3 in sequence.

The next step of stepping switch C moves arm C-1 to connect its contacts 4 and 5 thus completing a circuit through switch $A_1$, $D_1$ and $D_3$, contacts 4 and 5 of the timer B, contacts 5 and 4 of stepping switch C, switch $E_1$ of relay E, switch $T_4$ of relay T-1 and relay D. Relay D is thus actuated to disconnect switch $D_1$ from contact $D_3$ and to connect switch $D_1$ with contact $D_4$ and to close switch $D_2$. This operation breaks the circuit to the main portion of this system thereby locking switch $D_2$ closed, and by connecting switch $D_1$ with contact $D_4$ current flows to relay E, the latter operating to open switch $E_1$ to prevent flow of current back through relay $T_3$ and timer B. The circuit remains in this condition until switch $A_1$ opens at which time relays D and E return their respective switches to their normal and original positions and the circuit is ready to begin another backwashing cycle when timer A again closes its switch $A_1$.

The above-mentioned sequence of backwashing of the several filters was described relative, for example, to washing filter 17b, with a circuit closed through contacts 5 and 1 of stepping switch C. When this switch moves to close the circuit between contacts 5 and 2, relay H is inergized to operate switch $H_1$ to close a circuit first through W, $W_1$, $V_2$ and $L_2$ to open valve 38 and to close valve 29 thereby putting filter 18b on its backwash cycle. After about fifteen minutes, for example, this circuit through relay H is changed to pass current through contacts $W_2$, $W_3$, $V_2$ and $L_2$ to close valve 38 and to open valve 29 thereby placing filter 18b on its filter cycle. In like manner when stepping switch connects contacts 5 and 3, relay J operates its switch $J_1$ to close a circuit through contacts X, $X_1$, $V_3$ and $L_2$ thereby closing valve 30 and opening valve 39 and placing filter 19b on its backwash cycle. After about fifteen minutes, relay J operates to change switch $J_1$ thereby closing circuit through contacts $X_2$, $X_3$, $V_3$ and $L_2$ thereby closing valve 39 and opening valve 30 to place filter 19b on its filtration cycle. Upon replacing the last and final filter on filtration cycle, the relay F opens its switch $F_1$ to close down the backwash pump 40.

The backwashing cycle of the several filters ends with a charge of water and sludge in the backwash tank 20b. This material is ordinarily settled until shortly prior to the next day's backwashing operation. As mentioned hereinbefore, after settling for about 22 hours, for example, the clear water is pumped from tank 20b and retreated in the system, the pump being started manually by an operator and closed down automatically, with sludge also being withdrawn automatically through valve 49 into pit or sludge tank 50.

While well production oil and water to be treated, and the water filtered, enters the system via pipe 10 from one or more wells, this water is sometimes pressured through this treating and filter system by pressure of the output well pumps. Usually a pump is provided in pipe 11, for example, or in pipe 10 somewhere between the oil and water gathering lines and pipe 11. The only pumps specifically disclosed herein are the backwash water pump which pumps clear water through the backwash cycle in each of the several filters, the pump in pipe 74 and the water injection pumps 34 and 35. High pressure is not needed to pass the water through the filters, however, sufficient pressure must be provided to fill tanks 12a and 14a.

The contacts $V_1$, $U_1$ and $U_3$, illustrated in Figure 2 as a box and identified by reference numeral $a$, is the valve switching mechanism $a$ of Figure 1. Likewise, the contacts $V_2$, $W_1$ and $W_3$, and the contacts $V_3$, $X_1$ and $X_3$, illustrated in Figure 2 as boxes $b$ and $c$, respectively, are the valve switching mechanisms $b$ and $c$ of Figure 1.

While valve 47 is opened manually and pump 48 is started manually some time prior to beginning of the backwash cycle, this valve is under some conditions opened automatically and pump 48 also started automatically. To arrange for opening valve 47 and starting pump 48 automatically it is merely necessary to provide another timer and relay set to operate at some predetermined time prior to beginning of the backwash cycle by operation of timer A. If desired, timer A is set to hold switch $A_1$ closed for a length of time desired for settling the sludge in the backwash tank, and at the end of the desired settling time a sixth connection on timer B operates another relay and switch to open valve 47 and to start pump 48. It is preferred to stop pump 48 and to close valve 47 by liquid level controller assembly 47b, as hereinbefore described. Valve 49 for drainage of sludge from box 20c and the valve in pipe 17d are opened at the time pump 48 is shut off. Valve 17d is in some instances coupled operatively with float controller 47b to open at the same time valve 49 is opened, with both these valves closing at the same time. However, if desired, valve in pipe 17d for sludge drainage can be opened and closed manually.

Figure 3:
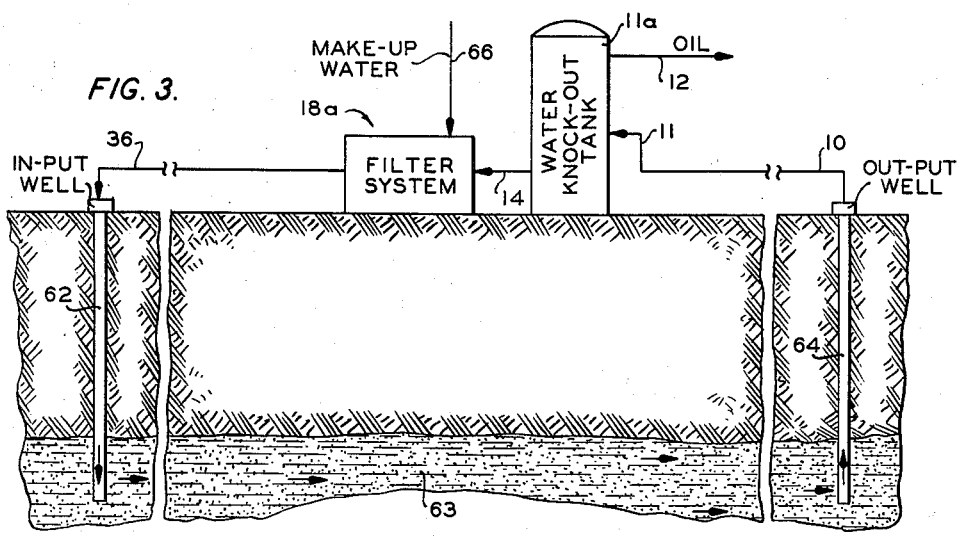
Figure 3 is an elevational view, in section, of my filter system in conjunction with a water flood operation.

Figure 3 illustrates, diagrammatically, installation of my filter system in a water-flood oil recovery operation. Filtered water from the clear tank 20a of the filter system 18a is passed through pipe 36 to one or more water injection or input wells 62. Water passes from this input well into and through an oil bearing formation 63 to one or more output wells 64. From the output well 64 oil and water are pumped by a pump, not shown, up the production tubing and through pipes 10 and 11 to the water knockout tank 11a. Separated oil or oil-rich emulsion leaves tank 11a for subsequent treatment in the heater 12a of Figure 1. Water from the knockout tank then passes via pipe 14 to the filter system 18a for filtration prior to recirculation to the input well or wells. Make-up water, and water for starting up the operation originates from a source, not shown, and is passed therefrom to the filter system 18a through a pipe 66.

While certain embodiments of the invention have been described for illustrative purposes, the invention obviously is not limited thereto.

I claim:

1. A liquid filter system comprising, in combination, a filter tank, a filter bed material disposed operatively in said filter tank, a liquid supply vessel, a backwash vessel and a clear liquid vessel, a first conduit communicating the portion of said filter tank below said filter bed material with said clear liquid tank, a first motor valve in said first conduit, a second conduit also communicating the portion of said filter tank below said filter bed material with said clear liquid tank, a second motor valve in said second conduit, a third conduit communicating said liquid supply tank with the portion of said filter tank above said filter bed material, a first check valve in said third conduit, said first check valve being adapted to pass liquid from said supply tank to said filter tank, a fourth conduit communicating said backwash tank with the portion of said filter tank above said filter bed material, a second check valve in said fourth conduit, said second check valve being adapted for passing liquid from said filter tank to said backwash tank, said third conduit including a first inverted U-tube intermediate said first check valve and said supply tank, a second inverted U-tube, one leg of which communicates with said third conduit intermediate said first check valve and said supply vessel, a fifth conduit communicating the other leg of said second U-tube with said clear liquid tank, a separate tube extending upward from each of the second and third U-tubes, the upper ends of the separate tubes being open to the atmosphere, a pump in said second conduit for transfer of liquid from said clear liquid tank to said filter tank, the top of said second U-tube being disposed at a higher elevation than the top of said first U-tube, said fourth conduit including a third inverted U-tube, a separate tube extending upward from each of said second and third U-tubes, the upper ends of these separate tubes being open to the atmosphere, the top of said third U-tube being disposed at a higher elevation than the top of said second U-tube, a source of electromotive force, first and second electrically operative relays communicating with said source, said first and second motor valves having, respectively, first and second valve operating mechanisms communicating with said source, said pump having an operating mechanism communicating with said source, a time clock control mechanism communicating said source with said relays and operating mechanisms whereby said clock, at a preset time, energizes said second valve operating mechanism to open its valve, de-energizes said first valve operating mechanism to close its valve and energizes said pump actuating mechanism to start the pump, and at a later preset time said clock de-energizes said second valve operating mechanism to close its valve, energizes said first valve operating mechanism to open its valve and de-energizes said pump actuating mechanism to stop the pump.

2. A liquid filter system comprising, in combination, a first filter vessel, filter bed material disposed operatively in said vessel, a second vessel for storage of clear water, first and second conduits communicating the portion of said first vessel on one side of said filter bed material with said second vessel, first and second motor valves in said first and second conduits respectively, a supply of liquid to be filtered, a third conduit communicating the portion of said filter vessel on the other side of said filter bed material and said supply of liquid, a third vessel for storage of backwash material, a fourth conduit communicating the portion of said first filter vessel on said other side of said filter bed material with said third vessel, first and second check valves in said third and fourth conduits respectively, said first and second check valves being adapted to pass liquid to and from said first vessel respectively, a fifth conduit communicating said supply of liquid with said second vessel, a first inverted U-tube in said third conduit intermediate said first check valve and said supply of liquid, a second inverted U-tube in said fifth conduit, a third inverted U-tube in said fourth conduit intermediate said second check valve and said third tank, the top of said second U-tube being disposed at a level below the top of said third U-tube, above the top of said first U-tube and at a level above said second vessel whereby liquid from said supply overflows said second inverted U-tube and passes through said fifth conduit to said second tank in preference to overflowing said first inverted U-tube, passing through said third conduit, said check valves, said fourth conduit and overflowing said third inverted U-tube into said third tank in the presence of a flow constriction in said first tank, a separate tube extending upward from each of said second and third U-tubes, the upper ends of these separate tubes being open to the atmosphere, a pump in said second conduit for transfer of liquid from said second vessel to the first vessel, a source of electromotive force, first and second electrically operative relays communicating with said source, said first and second motor valves having, respectively, first and second valve operating mechanisms communicating with said source, said pump having an operating mechanism communicating with said source, a time clock control mechanism communicating said source with said relays and operating mechanisms whereby said clock, at a preset time, energizes said second valve operating mechanism to open its valve, de-energizes said first valve operating mechanism to close its valve and energizes said pump actuating mechanism to start the pump, and at a later preset time said clock de-energizes said second valve operating mechanism to close its valve, energizes said first valve operating mechanism to open its valve and de-energizes said pump actuating mechanism to stop the pump.

3. A liquid filter system comprising, in combination, a first filter vessel, filter bed material disposed operatively in said vessel, a second vessel for storage of clear liquid, first and second conduits communicating the portion of said first vessel on one side of said filter bed material with said second vessel, first and second motor valves in said first and second conduits respectively, a third conduit communicating the portion of said filter vessel on the other side of said filter bed material and a supply of liquid to be filtered, a first check valve in said third conduit, said first check valve being adapted to pass liquid from said supply to said filter vessel, a third vessel for storage of backwash material, a fourth conduit communicating said third conduit intermediate said first check valve and said filter vessel with said third vessel, a second check valve in said fourth conduit, said second check valve being adapted to pass liquid from said third conduit to said third vessel, said third conduit including a first inverted U-tube intermediate said first check valve and said supply of liquid, a second inverted U-tube, the inlet tube of said second inverted U-tube communicating with said third conduit intermediate said first check valve and said supply of liquid, means for transferring liquid in said second conduit to said filter vessel, said fourth conduit including a third inverted U-tube, each of said first, second and third inverted U-tubes having an inlet and an outlet tube as regards direction of flow of liquid therethrough, a separate tube extending upward from each of said second and third U-tubes, the upper ends of these separate tubes being open to the atmosphere, a fifth conduit communicating the outlet of said second U-tube with said second vessel, the top of said first, second and third U-tubes being disposed at successively higher elevations, a source of electromotive force, first and second electrically operative relays communicating with said source, said first and second motor valves having, respectively, first and second valve operating mechanisms communicating with said source, said pump having an operating mechanism communicating with said source, a time clock control mechanism communicating said source with said relays and operating mechanisms whereby said clock, at a preset time, energizes said second valve operating mechanism to open its valve, de-energizes said first valve operating mechanism to close its valve and energizes said pump actuating mechanism to start the pump, and at a later preset time said clock de-energizes said second valve operating mechanism to close its valve, energizes said first valve operating mechanism to open its valve and de-energizes said pump actuating mechanism to stop the pump.

4. In a liquid flow control system the subcombination comprising, in combination, first, second and third inverted U-tubes, each of said inverted U-tubes having an inlet tube and an outlet tube as regards flow of liquid through the U-tubes, a separate tube extending upward from each of the second and third U-tubes, the upper ends of the separate tubes being open to the atmosphere, a first conduit communicating the outlet tube of said first U-tube with the inlet tube of said third U-tube, a second conduit communicating with the inlet tubes of the first and second inverted U-tubes for inlet of liquid thereto, a first tank having an inlet and an outlet for liquid flow, a filter bed operatively in said tank intermediate said inlet and outlet, a third conduit communicating the outlet tube of said first inverted U-tube with the inlet of said tank, the level of the top of said second inverted U-tube being above the level of the top of said first inverted U-tube but sufficiently below the level of the top of said third inverted U-tube that liquid passes over the top of said second inverted U-tube in preference to passing over the top of said first inverted U-tube, through said first conduit and over the top of said third inverted U-tube due to the presence of a restriction to the flow of liquid in said tank.

5. In the subcombination of claim 4, a pair of check valves in said first conduit, said check valves being adapted to pass liquid only in a direction from the outlet tube of said first U-tube, and at least a portion of said third conduit being separate from said first conduit, the separate portion of said third conduit branching from said first conduit at a position intermediate said check valves.

6. In the subcombination of claim 5, a second tank, a fourth conduit communicating the outlet of said first tank with said second tank, a pump in said fourth conduit, said pump being adapted to transfer liquid from said second tank to said first tank, a fifth conduit communicating said second tank with the outlet of said first tank, first and second motor valves disposed operatively in said fourth and fifth conduits respectively, a timer, a time sequence relay assembly in operable communication with said timer and with said first and second motor valves and with said pump, said relay being adapted in response to said timer and at a first predetermined time interval simultaneously to close said second motor valve, to open said first motor valve and to actuate said pump and after a second predetermined time interval alternately to stop said pump, to close said first motor valve and to close off said motor.

7. In the subcombination of claim 6 wherein said time sequence relay assembly controls electrically said motor valves and said pump.

8. In the system of claim 4, a third tube extending downward from the outlet tube of said second inverted U-tube, a valve in said third tube, whereby upon opening this latter mentioned valve the presence of liquid in said third tube can be observed.

9. In an oil recovery-water flood system having a water injection well communicating with an oil-water output well through an underground oil bearing formation, the improvement comprising, in combination, a first filter vessel, a filter bed material disposed operatively in said filter vessel, a second vessel for storage of filtered water, first and second conduits communicating the portion of said filter vessel on one side of said filter bed material with said second vessel, first and second motor valves in said first and second conduits respectively, a third conduit communicating the portion of said filter vessel on the other side of said filter bed material and a supply of water to be filtered, a third backwash tank, a fourth conduit communicating the portion of said filter vessel on said other side of said filter bed material with said backwash tank, first and second check valves in said third and fourth conduits respectively, said first and second check valves being adapted to pass water to and from said filter vessel in said third and fourth conduits respectively, said third conduit including a first inverted U-tube intermediate said first check valve and said supply, a second inverted U-tube one leg of which communicates with said third conduit intermediate said first check valve and said supply, a pump in said second conduit for transferring water to said filter vessel, said fourth conduit including a third inverted U-tube, a separate tube extending upward from each of the second and third U-tubes, the upper ends of the separate tubes being open to the atmosphere, the tops of said first, second and third inverted U-tubes being disposed at successively higher elevations, a source of electromotive force, first and second electrically operative relays communicating with said source, said first and second motor valves having, respectively, first and second valve operating mechanisms communicating with said source, said pump having an operating mechanism communicating with said source, a time clock control mechanism communicating said source with said relays and operating mechanisms whereby said clock, at a preset time, energizes said second valve operating mechanism to open its valve, de-energizes said first valve operating mechanism to close its valve and energizes said pump actuating mechanism to start the pump, and at a later preset time said clock de-energizes said second valve operating mechanism to close its valve, energizes said first valve operating mechanism to open its valve and de-energizes said pump actuating mechanism to stop the pump, a fifth conduit containing a pump for passage of clear water from said second vessel into said injection well, a sixth conduit for producing oil and water from said output well, an oil-water separator, a seventh conduit communicating said sixth conduit with said separator and said third conduit communicating with said separator as said supply of water to be filtered.

References Cited in the file of this patent

UNITED STATES PATENTS

| | | |
|---|---|---|
| 1,310,615 | Greenlee | July 22, 1919 |
| 1,947,679 | Steps | Feb. 20, 1934 |
| 2,076,322 | Pick | Apr. 6, 1937 |
| 2,348,161 | Van Duzee | May 2, 1944 |
| 2,588,437 | Von Tungeln | Mar. 11, 1952 |

UNITED STATES PATENT OFFICE

CERTIFICATE OF CORRECTION

Patent No. 2,925,912            February 23, 1960

Ernest E. Clark

It is hereby certified that error appears in the printed specification of the above numbered patent requiring correction and that the said Letters Patent should read as corrected below.

Column 9, line 45, before "and" insert -- tube --.

Signed and sealed this 16th day of August 1960.

(SEAL)
Attest:
KARL H. AXLINE
Attesting Officer

ROBERT C. WATSON
Commissioner of Patents